US012214999B1

(12) United States Patent
Wu et al.

(10) Patent No.: US 12,214,999 B1
(45) Date of Patent: Feb. 4, 2025

(54) INTELLIGENT HOISTING METHOD FOR BEAM SEGMENTS USED IN BRIDGEDECK CRANE SYSTEMS AND A BRIDGE DECK CRANE SYSTEM

(71) Applicant: POLY CHANGDA ENGINEERING CO., LTD., Guangzhou (CN)

(72) Inventors: Yuxian Wu, Guangzhou (CN); He Jin, Guangzhou (CN); Guocheng Rong, Guangzhou (CN); Shengquan Yan, Guangzhou (CN); Yanbiao Cai, Guangzhou (CN); Ping Yan, Guangzhou (CN); Duo Zou, Guangzhou (CN); Kunxing Li, Guangzhou (CN); Zuqiang Chen, Guangzhou (CN)

(73) Assignee: POLY CHANGDA ENGINEERING CO., LTD., Guangzhou (CN)

( * ) Notice: Subject to any disclaimer, the term of this patent is extended or adjusted under 35 U.S.C. 154(b) by 0 days.

(21) Appl. No.: 18/885,652

(22) Filed: Sep. 14, 2024

(30) Foreign Application Priority Data

Nov. 28, 2023 (CN) ......................... 202311612723.2

(51) Int. Cl.
*B66C 13/08* (2006.01)
*B66C 13/46* (2006.01)
*B66C 23/18* (2006.01)

(52) U.S. Cl.
CPC ............ *B66C 13/085* (2013.01); *B66C 13/46* (2013.01); *B66C 23/18* (2013.01)

(58) Field of Classification Search
CPC ....... B66D 13/085; B66D 13/46; B66D 23/18
See application file for complete search history.

(56) References Cited

U.S. PATENT DOCUMENTS 9,102,505 B2 * 8/2015 Rosberg .................. B66C 17/06

FOREIGN PATENT DOCUMENTS

CN 107345388 A 11/2017
CN 108821117 A 11/2018
CN 109680618 A 4/2019
CN 112148037 A * 12/2020
CN 113120773 A * 7/2021
CN 113718621 A * 11/2021
CN 114753256 A 7/2022
CN 114920145 A 8/2022
CN 115159346 A * 10/2022

(Continued)

*Primary Examiner* — Emmanuel M Marcelo
(74) *Attorney, Agent, or Firm* — Ming Jiang; MM IP SERVICES LLC

(57) ABSTRACT

The present application describes an intelligent hoisting method for a bridge deck crane system. The method involves determining the splicing heights at two key positions of the segment to be installed by measuring the alignment height of an already installed segment. The segment is hoisted, and the real-time heights at both positions are monitored. If one position reaches the splicing height while the other does not, the lifting point is adjusted until both positions align with their respective splicing heights. This method eliminates the need for reference marks or docking joints on the segment to be installed, thereby avoiding issues related to their precision and installation accuracy. Additionally, it simplifies the splicing operation by removing the need for pre-processing the segment, reducing the overall complexity of the process.

10 Claims, 4 Drawing Sheets

(56) References Cited

FOREIGN PATENT DOCUMENTS

| | | | | |
|---|---|---|---|---|
| CN | 115490148 | A | * | 12/2022 |
| CN | 115893194 | A | | 4/2023 |
| JP | 2010047905 | A | | 3/2010 |
| JP | 2015124088 | A | | 7/2015 |
| SU | 1537643 | A | | 1/1990 |
| WO | 2021208273 | A | | 10/2021 |

* cited by examiner

INTELLIGENT HOISTING METHOD FOR BEAM SEGMENTS USED IN BRIDGEDECK CRANE SYSTEMS AND A BRIDGE DECK CRANE SYSTEM

TECHNICAL FIELD

The present application relates to the technical field of bridge construction, particularly to an intelligent hoisting method for beam segments used in bridge deck crane systems and a bridge deck crane system.

BACKGROUND

In bridge steel beam construction, the cantilever assembly method is typically used for hoisting, which is a critical step in ensuring the proper alignment and installation of the beam segments. If the alignment between the segments to be installed and the already installed segments is not controlled precisely, it may result in cumulative linear errors in the installed segments, which can be challenging to correct in subsequent construction steps. Traditionally, in the assembly process of beam segments in bridge steel beam construction, leveling instruments are used to measure monitoring points, with the results being relayed to on-site monitoring personnel. After analysis, height adjustment measures are proposed for the beam segments, and crane operators then control the crane accordingly to align and install the segments. This method is complex, requires multiple personnel, takes a long time for measurements, and offers low measurement accuracy.

Therefore, a common method for segment assembly involves setting standard markers or connection joints on the installed segments and reference markers or alignment joints on the segments to be installed. Machine vision is then used to obtain information about the standard and reference markers, which guides the adjustment of the segments to be installed. During alignment, the connection joints can be used to achieve precise alignment.

However, this assembly method requires pre-processing of the segments to be installed by setting reference markers or alignment joints, where the precision of the reference markers or alignment joints directly affects the subsequent alignment and assembly accuracy. Thus, there are issues with the complexity of operations and low alignment accuracy.

SUMMARY

In view of the aforementioned issues, it is necessary to provide an intelligent hoisting method for beam segments used in bridge deck crane systems and a bridge deck crane system that reduces operational complexity and improves alignment accuracy.

An intelligent hoisting method for beam segments used in bridge deck crane systems comprises:

- Obtaining the alignment height at the edge of the installed segment, and deriving the first splicing height at a first position and the second splicing height at a second position of the segment to be installed based on the alignment height; wherein the distance between the first position and the edge of the installed segment differs from the distance between the second position and the edge of the installed segment;
- Hoisting the segment to be installed and continuously obtaining the first real-time height at the first position and the second real-time height at the second position of the segment to be installed until either the first real-time height equals the first splicing height or the second real-time height equals the second splicing height;
- If the first real-time height equals the first splicing height, adjusting the lifting point on the segment to be installed to move toward the first position, while continuously adjusting the lifting height of the segment to maintain the first real-time height equal to the first splicing height until the second real-time height equals the second splicing height;
- If the second real-time height equals the second splicing height, adjusting the lifting point on the segment to be installed to move toward the second position, while continuously adjusting the lifting height of the segment to maintain the second real-time height equal to the second splicing height until the first real-time height equals the first splicing height.

In one embodiment, the method of hoisting the segment to be installed and continuously obtaining the first real-time height at the first position and the second real-time height at the second position of the segment to be installed until either the first real-time height equals the first splicing height or the second real-time height equals the second splicing height further includes:

- Simultaneously and continuously obtaining the third real-time height at a third position of the segment to be installed; wherein the third position directly corresponds to a different position on the edge of the installed segment from the first position, and the distance between the third position and the edge of the installed segment is the same as the distance between the first position and the edge of the installed segment; the segment to be installed includes at least two lifting points, with two of the lifting points being located near the first and third positions, respectively;
- Adjusting the lifting height at the lifting point located at the third position of the segment to be installed and continuously adjusting the lifting height of the segment to maintain the first real-time height equal to the first splicing height until the third real-time height equals the first splicing height.

In one embodiment, obtaining the alignment height at the edge of the installed segment includes:

- Obtaining the first alignment height directly corresponding to the first position at the edge of the installed segment and deriving the first splicing height at the first position of the segment to be installed based on the first alignment height;
- Obtaining the second alignment height directly corresponding to the third position at the edge of the installed segment and deriving the third splicing height at the third position of the segment to be installed based on the second alignment height;
- Adjusting the lifting height at the lifting point located at the third position of the segment to be installed until the third real-time height equals the first splicing height includes:
- Adjusting the lifting height at the lifting point located at the third position of the segment to be installed until the third real-time height equals the third splicing height.

In one embodiment, hoisting the segment to be installed and continuously obtaining the first real-time height at the first position and the second real-time height at the second position of the segment to be installed includes:

- Hoisting the segment to be installed at a first speed and continuously obtaining the first real-time height at the first position and the second real-time height at the second position of the segment to be installed;

Adjusting the lifting point on the segment to be installed to move toward the first position and continuously adjusting the lifting height of the segment to maintain the first real-time height equal to the first splicing height includes:

Adjusting the lifting point on the segment to be installed to move toward the first position and continuously adjusting the lifting height of the segment at a second speed to maintain the first real-time height equal to the first splicing height;

Adjusting the lifting point on the segment to be installed to move toward the second position and continuously adjusting the lifting height of the segment to maintain the second real-time height equal to the second splicing height includes:

Adjusting the lifting point on the segment to be installed to move toward the second position and continuously adjusting the lifting height of the segment at a second speed to maintain the second real-time height equal to the second splicing height;

Wherein the first speed is greater than the second speed.

In one embodiment, the intelligent hoisting method for beam segments further includes:

Obtaining the displacement distance between the segment to be installed and the installed segment;

Controlling the segment to be installed to move toward the installed segment by the displacement distance.

In one embodiment, obtaining the displacement distance between the segment to be installed and the installed segment includes:

Controlling an alignment distance sensor to rotate toward the segment to be installed and emit a distance sensing signal;

Obtaining the shortest distance value corresponding to the shortest distance position sensed by the alignment distance sensor;

Deriving the displacement distance between the segment to be installed and the installed segment based on the shortest distance value and the alignment height.

The intelligent hoisting method for beam segments used in bridge deck crane systems involves obtaining the alignment height at the edge of the installed segment using an alignment distance sensor. Based on this alignment height, the first splicing height at the first position and the second splicing height at the second position of the segment to be installed are determined. The segment to be installed is then hoisted, and the first real-time height at the first position and the second real-time height at the second position are continuously obtained through the first and second distance sensors, respectively. Once the first real-time height equals the first splicing height or the second real-time height equals the second splicing height, the height of the segment to be installed will match that of the installed segment. Since the distances from the first and second positions to the edge of the installed segment are different, if one position reaches the splicing height while the other does not, it indicates that the segment to be installed is at an angle. By adjusting the position of the lifting point on the segment to move towards either the first or second position, the angle of the segment to be installed can be corrected until both the first and second real-time heights match the splicing heights. The splicing heights are determined based on the alignment height, ensuring that the segment to be installed is aligned with the installed segment both in height and angle. This method does not require reference markers or connection joints to be pre-set on the segment to be installed, thereby reducing the influence of marker precision on alignment accuracy. Additionally, this method eliminates the need for pre-processing the segment, effectively reducing the complexity of the alignment operation.

A bridge deck crane system, comprising a bridge deck crane body, a beam lifting mechanism, and a hoisting control mechanism. The bridge deck crane body includes a top operation platform, inclined support rods, and a rear tension assembly. The top operation platform is installed on the rear tension assembly, with one end of the inclined support rod connected to the top operation platform and the other end connected to the rear tension assembly, positioned below and inclined relative to the top operation platform. The beam lifting mechanism includes a beam lifter, lifting point moving parts, a winch, a sling, and a lifter displacement member. The winch is installed on the top operation platform, and the lifter displacement member is controlled to drive the winch to move. The lifting point moving parts are arranged on the beam lifter, with one end of the sling connected to the winch and the other end connected to the beam lifter through the lifting point moving parts, positioning the beam lifter below the inclined support rod. The lifting point moving parts are controlled to drive the connection position between the sling and the beam lifter to move towards or away from the inclined support rod. The winch is controlled to retract and release the sling. The hoisting control mechanism includes an alignment distance sensor, a first distance sensor, a second distance sensor, and a hoisting controller. The alignment distance sensor is positioned below the inclined support rod, aligned with the edge of the installed segment. Both the first and second distance sensors are positioned below the inclined support rod and aligned with the segment to be installed, with different distances from the edge of the installed segment. The alignment distance sensor, first distance sensor, and second distance sensor are all electrically connected to the hoisting controller. The alignment distance sensor is used to obtain the alignment height at the edge of the installed segment. The first distance sensor is used to obtain the first real-time height at the first position of the segment to be installed, and the second distance sensor is used to obtain the second real-time height at the second position of the segment to be installed. The hoisting controller executes the steps of the method described above.

In one embodiment, the hoisting control mechanism further includes an angle adjuster, with the alignment distance sensor installed on the inclined support rod via the angle adjuster. The angle adjuster is used to drive the alignment distance sensor to rotate towards or away from the first distance sensor. The hoisting controller is used to obtain the rotation angle of the alignment distance sensor driven by the angle adjuster and continuously obtain the sensing distance of the alignment distance sensor.

In one embodiment, there are two inclined support rods positioned opposite each other, with two beam lifting mechanisms also positioned opposite each other. Each beam lifting mechanism is arranged at one inclined support rod. The alignment distance sensor is positioned on one inclined support rod. The hoisting control mechanism also includes a third distance sensor. The first and third distance sensors are positioned on different inclined support rods, while the second distance sensor is positioned on one of the inclined support rods, with the first and second distance sensors positioned at different heights on the inclined support rod. The third distance sensor is used to obtain the third real-time height at the third position of the segment to be installed.

In one embodiment, there are two alignment distance sensors, with each positioned at the same height on the two inclined support rods. One alignment distance sensor is used to obtain the first alignment height at the edge of the installed segment corresponding to the first position of the segment to be installed, while the other alignment distance sensor is used to obtain the second alignment height corresponding to the third position.

In the above bridge deck crane system, the beam lifter is connected to the segment to be installed. The alignment height at the edge of the installed segment is obtained using the alignment distance sensor, and the first splicing height at the first position and the second splicing height at the second position of the segment to be installed are determined based on the alignment height. The segment to be installed is then hoisted, and the first real-time height at the first position and the second real-time height at the second position are continuously obtained through the first and second distance sensors, respectively, until either the first real-time height equals the first splicing height or the second real-time height equals the second splicing height. Once these heights match, the height of the segment to be installed aligns with the installed segment. Given the different distances from the first and second positions to the edge of the installed segment, if one position reaches the splicing height while the other does not, it indicates that the segment to be installed is at an angle. By controlling the lifting point moving parts to adjust the position of the sling relative to the beam lifter, the lifting point on the segment to be installed can be adjusted to move towards either the first or second position, correcting the angle until both the first and second real-time heights match the splicing heights. The splicing heights are determined based on the alignment height, ensuring the segment to be installed aligns with the installed segment both in height and angle.

The above bridge deck crane system does not require reference markers or connection joints to be pre-set on the segment to be installed. The height and angle of the segment to be installed are determined and adjusted based on real-time monitoring using the first and second distance sensors, eliminating the influence of marker precision on alignment accuracy. Additionally, this system does not require pre-processing of the segment, effectively reducing the complexity of the alignment operation

BRIEF DESCRIPTION OF THE DRAWINGS

The drawings, which form part of this application, provide a further understanding of the invention. The illustrative embodiments and their descriptions are used to explain the invention and do not unduly limit the scope of the invention.

To more clearly illustrate the technical solutions in the embodiments of the present invention, the drawings required for the description of the embodiments are briefly introduced below. Obviously, the drawings described below are only some embodiments of the present invention. For those skilled in the art, other drawings can be obtained based on these drawings without creative effort.

Figure 1:
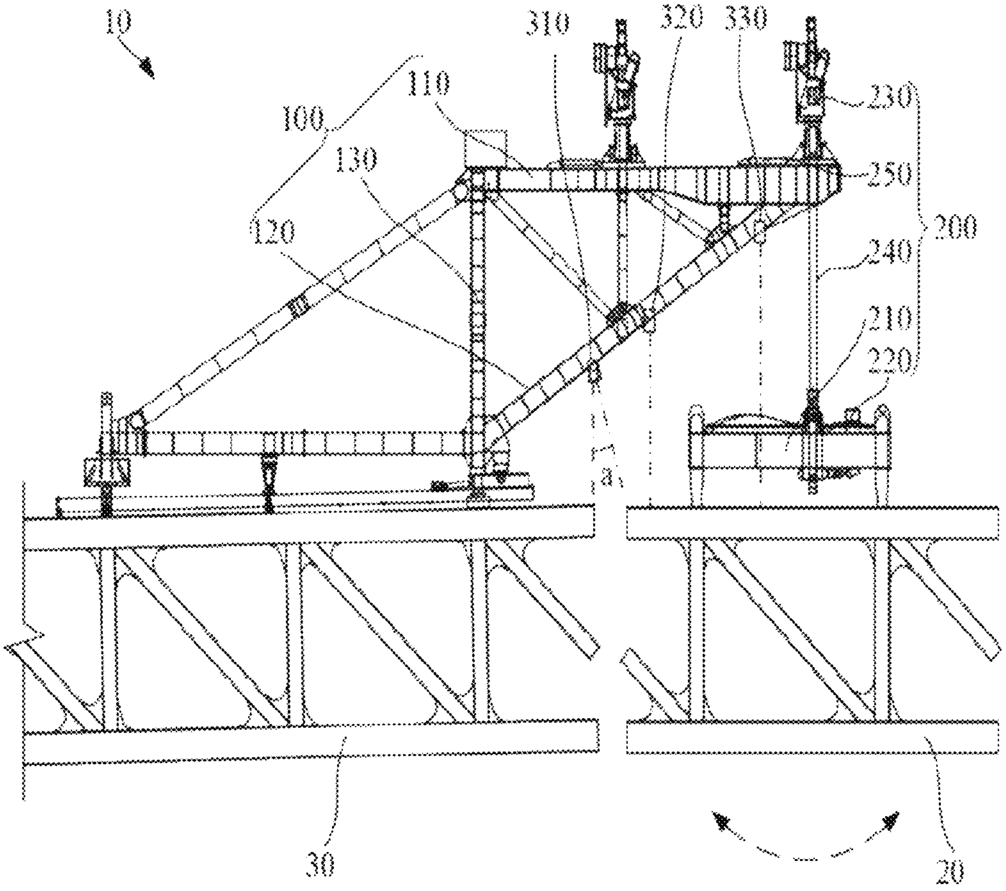

Additionally, the drawings are not drawn to scale, and the relative sizes of the components in the drawings are depicted illustratively and may not necessarily be drawn to real proportions. In the drawings:

FIG. 1 is a side view of the bridge deck crane system according to one embodiment.

Figure 2:
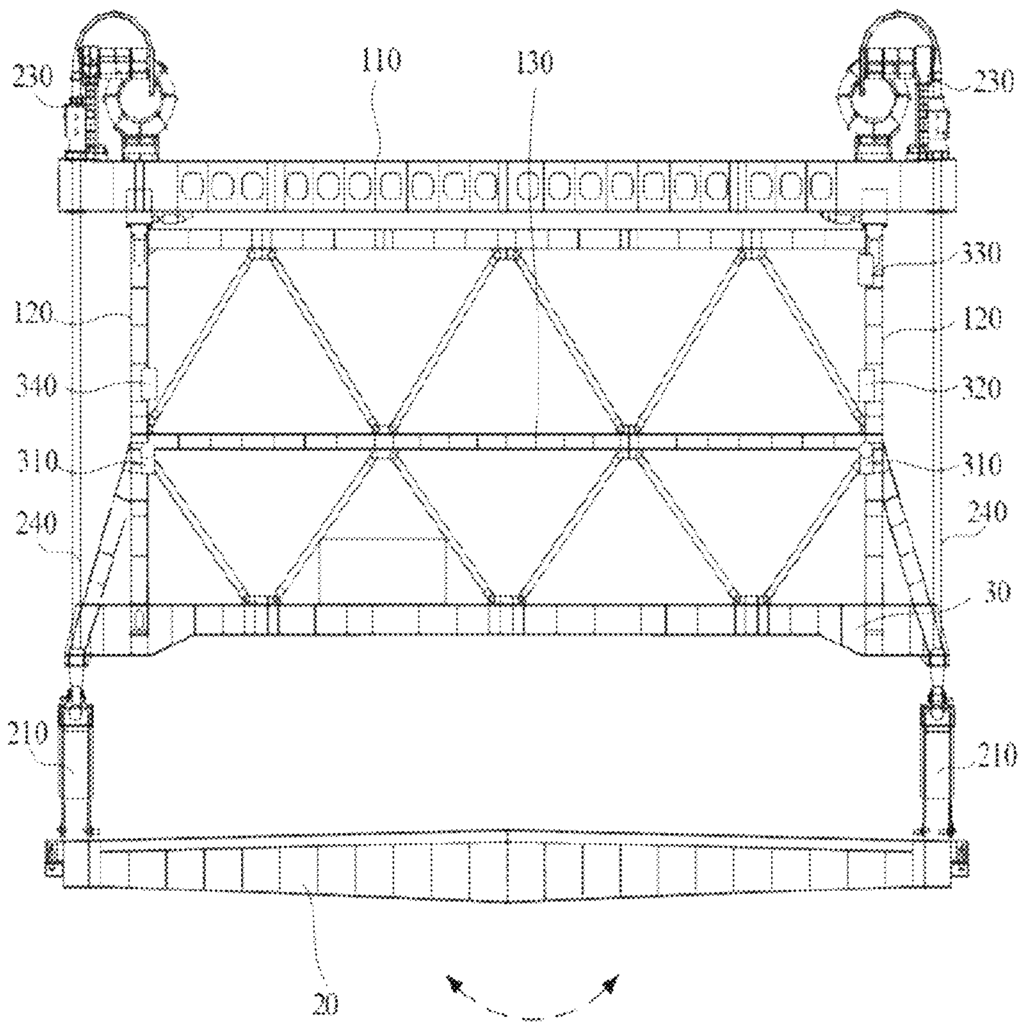

FIG. 2 is a front view of the bridge deck crane system shown in FIG. 1.

Figure 3:
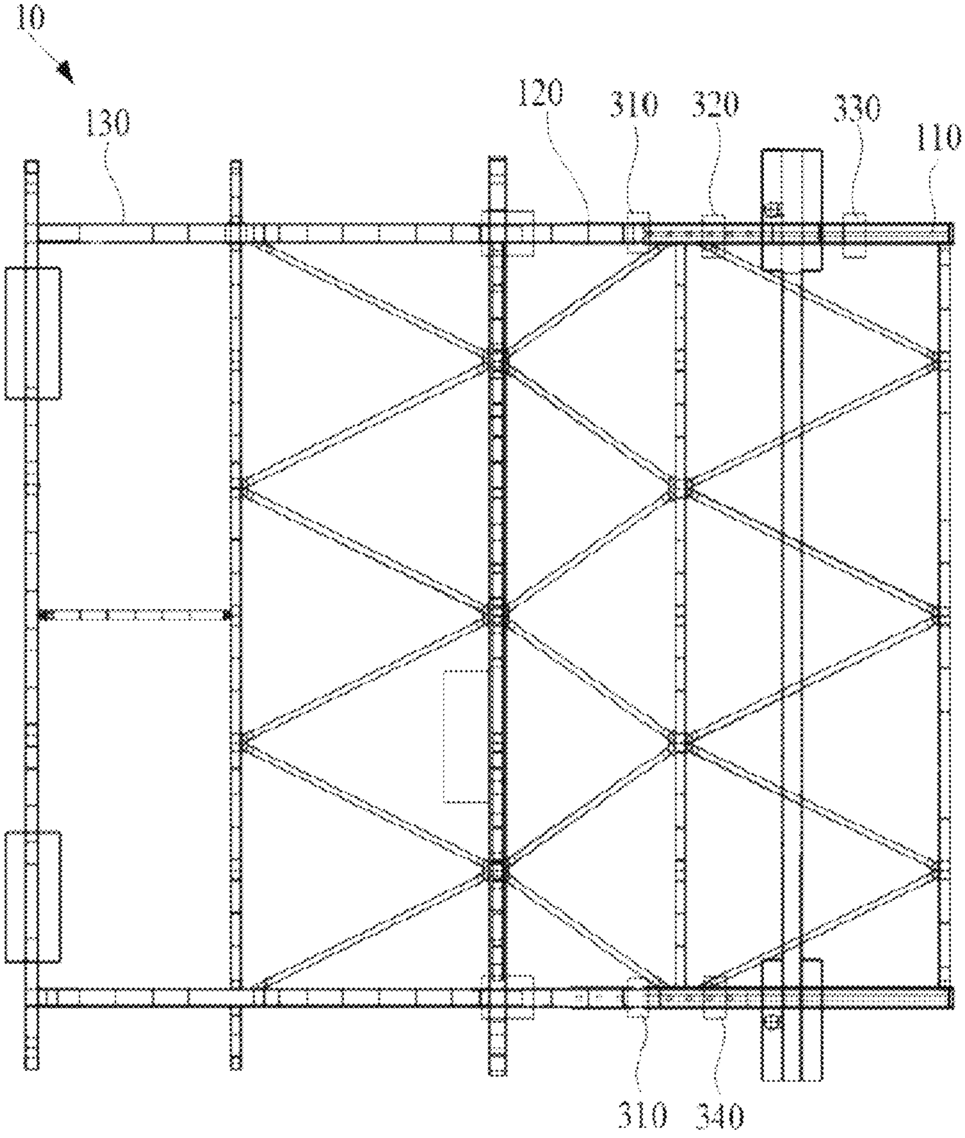

FIG. 3 is a top view of the bridge deck crane system shown in FIG. 1.

Figure 4:
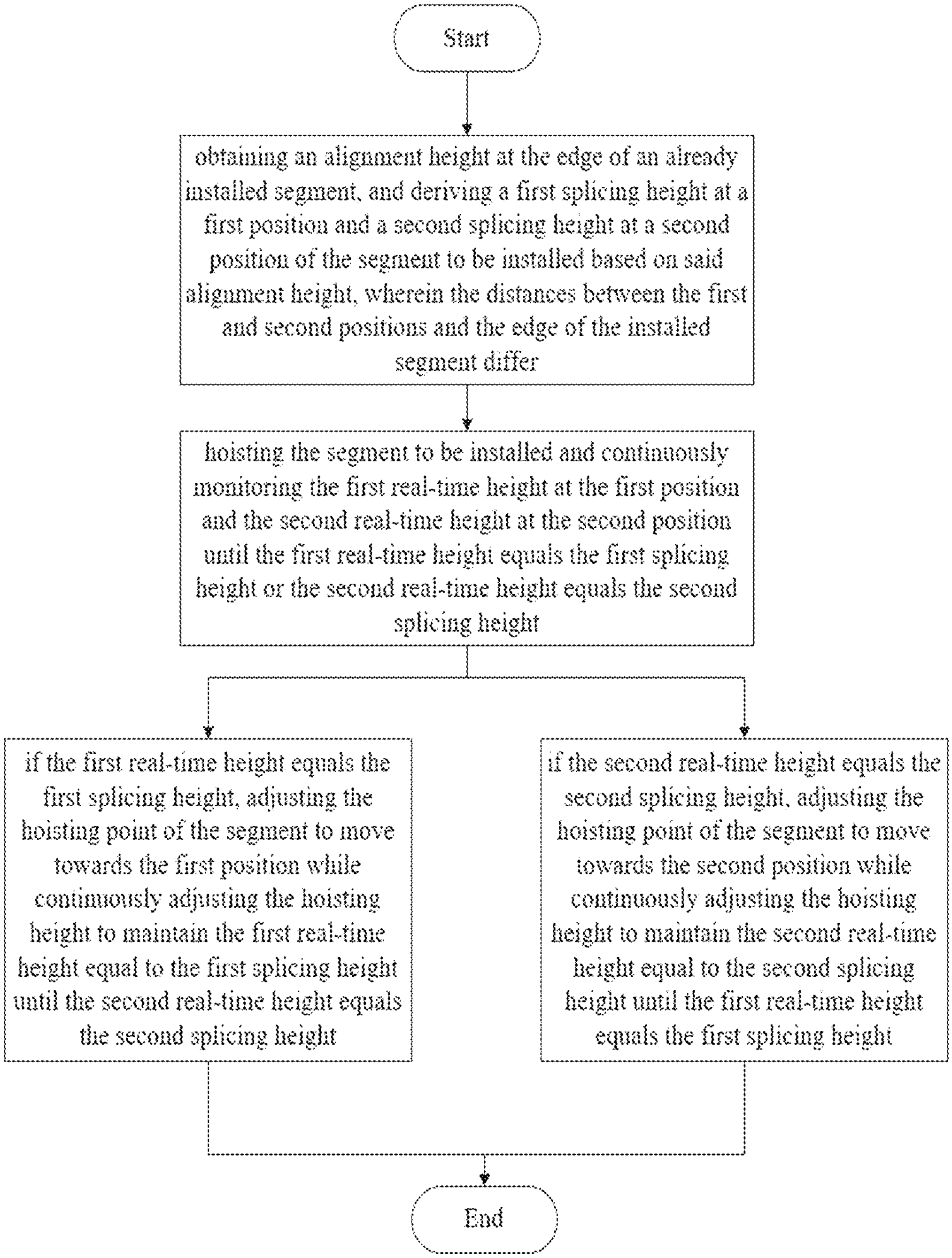

FIG. 4 is a flowchart of the intelligent hoisting method for beam segments used in a bridge deck crane system according to one embodiment.

Reference Numerals: Bridge deck crane system 10; bridge deck crane body 100; top operation platform 110; inclined support rod 120; rear tension assembly 130; beam lifting mechanism 200; beam lifter 210; lifting point moving part 220; winch 230; sling 240; lifter displacement member 250; alignment distance sensor 310; first distance sensor 320; second distance sensor 330; third distance sensor 340; segment to be installed 20; installed segment 30.

DETAILED DESCRIPTION

To make the objectives, features, and advantages of this application more apparent, the following detailed description of the specific embodiments will be provided in conjunction with the accompanying drawings. Many specific details are provided in the following description to fully understand this application. However, this application can be implemented in various ways different from those described herein, and those skilled in the art can make similar improvements without departing from the essence of this application. Therefore, this application is not limited to the specific embodiments disclosed below.

Referring to FIGS. 1 to 3, a bridge deck crane system 10 is described, which can at least reduce the complexity of alignment and splicing operations for the segment 20 to be installed and improve splicing precision.

Specifically, the bridge deck crane system 10 includes the bridge deck crane main body 100 and the beam lifting mechanism 200. The bridge deck crane main body 100 comprises a top operation platform 110, an inclined support rod 120, and a back pull assembly 130. The top operation platform 110 is set on the back pull assembly 130. One end of the inclined support rod 120 is connected to the top operation platform 110, and the other end is connected to the back pull assembly 130. The inclined support rod 120 is located below the top operation platform 110 and is inclined relative to it. The beam lifting mechanism 200 includes a beam hanger 210, a lifting point moving component 220, a winch 230, a lifting rope 240, and a lifting fixture moving component 250. The winch 230 is set on the top operation platform 110, and the lifting fixture moving component 250 is also set on the top operation platform 110 and is controlled to drive the winch 230 to move. The lifting point moving component 220 is set on the beam hanger 210. One end of the lifting rope 240 is connected to the winch 230, and the other end is connected to the beam hanger 210 through the lifting point moving component 220, positioning the beam hanger 210 below the inclined support rod 120. The lifting point moving component 220 is controlled to drive the connection position between the lifting rope 240 and the beam hanger 210 to move towards or away from the inclined support rod 120, and the winch 230 is controlled to reel in or release the lifting rope 240.

During use, the inclined support rod 120 and back pull assembly 130 provide support and installation space. The inclined support rod 120 is set at an angle to allow the hanger to be positioned below the inclined support rod 120, providing operational space for lifting the segment 20 to be installed using the beam hanger 210. The top operation platform 110 facilitates the installation of the beam lifting mechanism 200, providing operational space for the operation of the beam lifting mechanism 200. The winch 230, controlled to reel in or release the lifting rope 240, adjusts the lifting height of the segment 20 to be installed. The lifting fixture moving component 250 controls the movement of the winch 230, adjusting the distance between the segment 20 to be installed and the installed segment 30. The lifting point moving component 220, controlled to drive the connection position between the lifting rope 240 and the beam hanger 210 to move towards or away from the inclined support rod 120, adjusts the lifting point position of the segment 20 to be installed, thereby adjusting the tilt angle of the segment 20 relative to the installed segment 30.

In one embodiment, two inclined support rods 120 are provided, set apart from each other. Two beam lifting mechanisms 200 are also provided, with each beam lifting mechanism 200 corresponding to one inclined support rod 120. This setup improves the uniformity of forces acting on the segment 20 during lifting.

In one embodiment, the bridge deck crane system 10 also includes a hoisting control mechanism, which consists of an alignment distance sensor 310, a first distance sensor 320, a second distance sensor 330, and a hoisting controller. The alignment distance sensor 310 is set below the inclined support rod 120 and aligned with the edge of the installed segment 30. The first distance sensor 320 and the second distance sensor 330 are both set below the inclined support rod 120, aligned with the segment 20 to be installed, but at different distances from the edge of the installed segment 30. The alignment distance sensor 310, first distance sensor 320, and second distance sensor 330 are all electrically connected to the hoisting controller. The alignment distance sensor 310 is used to obtain the alignment height at the edge of the installed segment 30, while the first distance sensor 320 and the second distance sensor 330 are used to obtain the real-time heights at the first and second positions of the segment 20 to be installed.

During construction, the bridge deck crane system 10 connects the beam hanger 210 to the segment 20 to be installed. The alignment distance sensor 310 is used to obtain the alignment height at the edge of the installed segment 30, which is used to determine the first splicing height at the first position of the segment 20 to be installed and the second splicing height at the second position. The segment 20 to be installed is then lifted, and the first distance sensor 320 continuously obtains the real-time height at the first position, while the second distance sensor 330 does the same for the second position, until either real-time height matches its corresponding splicing height. At this point, the height of the segment 20 to be installed matches that of the installed segment 30. Since the distances from the first and second positions to the edge of the installed segment 30 are different, if the real-time height at one position reaches the splicing height while the other does not, it indicates that the segment 20 to be installed is tilted. The lifting point moving component 220 then adjusts the lifting point position to align the segment 20 to be installed with the installed segment 30, rotating it until both real-time heights match their corresponding splicing heights. These heights are determined based on the alignment height at the edge of the installed segment 30, ensuring that the segment 20 to be installed is aligned in both height and tilt angle with the installed segment 30.

The bridge deck crane system 10 does not require reference marks or connecting joints to be set on the segment 20 to be installed before lifting. The height and tilt angle of the segment 20 to be installed are adjusted based on real-time monitoring results, eliminating the influence of the accuracy of the reference marks or connecting joints on splicing accuracy. This method also eliminates the need for preprocessing the segment 20 to be installed, effectively reducing the complexity of the splicing operation.

In one embodiment, two inclined support rods 120 and two beam lifting mechanisms 200 are provided, with each beam lifting mechanism 200 corresponding to one inclined support rod 120. The alignment distance sensor 310 is set on one inclined support rod 120. Specifically, the hoisting control mechanism further includes a third distance sensor 340. The first distance sensor 320 and the third distance sensor 340 are set on different inclined support rods 120, and the second distance sensor 330 is set on one inclined support rod 120 at different height positions. The third distance sensor 340 is used to obtain the real-time height at the third position of the segment 20 to be installed.

Specifically, the first distance sensor 320 and the third distance sensor 340 are positioned at the same height. During construction, the third distance sensor 340 continuously obtains the real-time height at the third position of the segment 20 to be installed. Since the first distance sensor 320 and the third distance sensor 340 are set on different inclined support rods 120, the third position aligns with a different position at the edge of the installed segment 30 than the first position. The lifting height of the lifting point corresponding to the third distance sensor 340 is adjusted until the real-time height at the third position matches the first splicing height.

The segment 20 to be installed may be tilted relative to the installed segment 30, as indicated by the arrows in FIG. 1 or FIG. 2. If the tilt is as shown in FIG. 1, the distances at the first and second positions can be detected using the first distance sensor 320 and the second distance sensor 330, and the lifting point position of the segment 20 to be installed can be adjusted accordingly. If the tilt is as shown in FIG. 2, the distances at the first and third positions can be detected using the first distance sensor 320 and the third distance sensor 340, and the lifting heights of the corresponding lifting points can be adjusted accordingly.

In one embodiment, the number of alignment distance sensors 310 is two, and they are set at the same height on the two inclined support rods 120. One alignment distance sensor 310 is used to obtain the alignment height at the edge of the installed segment 30 corresponding to the first position of the segment 20 to be installed, and the other alignment distance sensor 310 is used to obtain the alignment height at the edge of the installed segment 30 corresponding to the third position of the segment 20 to be installed.

By obtaining the alignment height at the edge of the installed segment 30 corresponding to the first position of the segment 20 to be installed using one alignment distance sensor 310 and determining the first splicing height based on the alignment height, and by obtaining the alignment height at the edge of the installed segment 30 corresponding to the third position of the segment 20 to be installed using another alignment distance sensor 310 and determining the third splicing height based on the alignment height, the lifting height of the lifting point at the third position can be adjusted until the real-time height at the third position matches the third splicing height. The second splicing height corresponding to the second distance sensor 330 can be confirmed by either the first or second alignment height obtained by the alignment distance sensors 310.

In one embodiment, the hoisting control mechanism further includes an angle adjuster. The alignment distance sensor 310 is set on the inclined support rod 120 via the angle adjuster, which is used to drive the alignment distance sensor 310 to rotate towards or away from the first distance sensor 320. The hoisting controller is used to obtain the rotation angle driven by the angle adjuster and continuously obtain the sensing distance of the alignment distance sensor 310. The angle adjuster facilitates the adjustment of the alignment distance sensor 310's angle, making it easier to adjust the direction of the distance measurement by the alignment distance sensor 310 and sense the distance between the segment 20 to be installed and the installed segment 30.

In other embodiments, the angle adjuster can be omitted, and the alignment distance sensor 310 itself can have an adjustable emission angle for its distance sensing signal.

In one embodiment, the alignment distance sensor 310, the first distance sensor 320, the second distance sensor 330, and the third distance sensor 340 can be infrared distance sensors, ultrasonic distance sensors, laser distance sensors, or other types of sensors. Specifically, the alignment distance sensor 310 can be a laser distance sensor, which facilitates angle control, making it easier to detect the distance between the installed segment 30 and the segment 20 to be installed. The alignment distance sensor 310, first distance sensor 320, second distance sensor 330, and third distance sensor 340 can be of the same type or different types of distance sensors, as long as they can achieve real-time distance measurement.

Referring to FIGS. 1, 2, and 4, one embodiment discloses an intelligent segment hoisting method for a bridge deck crane system 10, where the bridge deck crane system 10 is as described in any of the previous embodiments. Specifically, the intelligent segment hoisting method includes:

Step S100: Obtain the alignment height at the edge of the installed segment 30 and determine the first splicing height at the first position of the segment 20 to be installed and the second splicing height at the second position based on the alignment height. The distances from the first and second positions to the edge of the installed segment 30 are different.

Step S200: Lift the segment 20 to be installed and continuously obtain the real-time heights at the first and second positions until the real-time height at the first position matches the first splicing height or the real-time height at the second position matches the second splicing height.

Step S300: If the real-time height at the first position matches the first splicing height, adjust the lifting point position of the segment 20 to be installed towards the first position and continuously adjust the lifting height to maintain the real-time height at the first position matching the first splicing height until the real-time height at the second position matches the second splicing height.

Step S400: If the real-time height at the second position matches the second splicing height, adjust the lifting point position of the segment 20 to be installed towards the second position and continuously adjust the lifting height to maintain the real-time height at the second position matching the second splicing height until the real-time height at the first position matches the first splicing height.

In this embodiment, the alignment distance sensor 310 is used to obtain the alignment height at the edge of the installed segment 30. The first distance sensor 320 is used to obtain the real-time height at the first position of the segment 20 to be installed, and the second distance sensor 330 is used to obtain the real-time height at the second position of the segment 20 to be installed.

The above intelligent segment hoisting method for the bridge deck crane system 10 uses the alignment distance sensor 310 to obtain the alignment height at the edge of the installed segment 30 and determine the first splicing height at the first position of the segment 20 to be installed and the second splicing height at the second position based on the alignment height. The segment 20 to be installed is then lifted, and the first distance sensor 320 continuously obtains the real-time height at the first position, while the second distance sensor 330 does the same for the second position, until either real-time height matches its corresponding splicing height. At this point, the height of the segment 20 to be installed matches that of the installed segment 30. Since the distances from the first and second positions to the edge of the installed segment 30 are different, if the real-time height at one position reaches the splicing height while the other does not, it indicates that the segment 20 to be installed is tilted. The lifting point position is then adjusted to align the segment 20 to be installed with the installed segment 30, rotating it until both real-time heights match their corresponding splicing heights. These heights are determined based on the alignment height at the edge of the installed segment 30, ensuring that the segment 20 to be installed is aligned in both height and tilt angle with the installed segment 30. The above intelligent segment hoisting method does not require reference marks or connecting joints to be set on the segment 20 to be installed before lifting. The height and tilt angle of the segment 20 to be installed are adjusted based on real-time monitoring results, eliminating the influence of the accuracy of the reference marks or connecting joints on splicing accuracy. This method also eliminates the need for pre-processing the segment 20 to be installed, effectively reducing the complexity of the splicing operation.

In one embodiment, as shown in FIG. 1, since the alignment distance sensor 310, the first distance sensor 320, and the second distance sensor 330 are all set on the inclined support rod 120, and the inclination angle of the inclined support rod 120 is known, the splicing heights at the first and second positions can be determined using trigonometric functions based on the alignment height obtained by the alignment distance sensor 310.

In this embodiment, since the segment 20 to be installed may be tilted relative to the installed segment 30, as shown by the arrow in FIG. 1, the distances at the first and second positions can be detected using the first distance sensor 320 and the second distance sensor 330, and the lifting point position of the segment 20 to be installed can be adjusted accordingly.

In one embodiment, Step S200: Lift the segment 20 to be installed and continuously obtain the real-time heights at the first and second positions until the real-time height at the first position matches the first splicing height or the real-time height at the second position matches the second splicing height, further includes:

Synchronously and continuously obtain the real-time height at the third position of the segment 20 to be installed. The third position aligns with a different position at the edge of the installed segment 30 than the first position, and the distances from the first and third positions to the edge of the installed segment 30 are the same. The segment 20 to be installed has at least two lifting points, with two of the lifting points positioned near the first and third positions.

Adjust the lifting height of the lifting point at the third position of the segment 20 to be installed, and continuously adjust the lifting height to maintain the real-time height at the first position matching the first splicing height until the real-time height at the third position matches the first splicing height.

Since the third position aligns with a different position at the edge of the installed segment 30, the lifting height of the lifting point at the third position of the segment 20 to be installed is adjusted until the real-time height at the third position matches the first splicing height. At this point, the plane height and angle of the segment 20 to be installed are known relative to the installed segment 30.

Specifically, the real-time height at the third position of the segment 20 to be installed is obtained using the third distance sensor 340. Since the segment 20 to be installed may be tilted relative to the installed segment 30, as shown by the arrow in FIG. 2, the distances at the first and third positions can be detected using the first distance sensor 320 and the third distance sensor 340, and the lifting heights of the corresponding lifting points can be adjusted accordingly.

In this embodiment, since the real-time height at the first position is first detected to match the splicing height, if the segment 20 to be installed is tilted as shown by the arrow in FIG. 2, the third position needs to be rotated upward until the real-time height at the third position matches the first splicing height.

In one embodiment, Step S100: Obtain the alignment height at the edge of the installed segment 30 includes:

Obtain the alignment height at the edge of the installed segment 30 corresponding to the first position of the segment 20 to be installed and determine the first splicing height based on the alignment height.

Obtain the alignment height at the edge of the installed segment 30 corresponding to the third position of the segment 20 to be installed and determine the third splicing height based on the alignment height.

Specifically, adjust the lifting height of the lifting point at the third position of the segment 20 to be installed until the real-time height at the third position matches the first splicing height, including:

Adjust the lifting height of the lifting point at the third position of the segment 20 to be installed until the real-time height at the third position matches the third splicing height.

By obtaining the alignment height at the edge of the installed segment 30 corresponding to the first position of the segment 20 to be installed using one alignment distance sensor 310 and determining the first splicing height based on the alignment height, and by obtaining the alignment height at the edge of the installed segment 30 corresponding to the third position of the segment 20 to be installed using another alignment distance sensor 310 and determining the third splicing height based on the alignment height, the lifting height of the lifting point at the third position can be adjusted until the real-time height at the third position matches the third splicing height. The second splicing height corresponding to the second distance sensor 330 can be confirmed by either the first or second alignment height obtained by the alignment distance sensors 310.

In one embodiment, Step S200: Lift the segment 20 to be installed and continuously obtain the real-time heights at the first and second positions until the real-time height at the first position matches the first splicing height or the real-time height at the second position matches the second splicing height, includes:

Lift the segment 20 to be installed at a first speed and continuously obtain the real-time heights at the first and second positions.

Adjust the lifting point position of the segment 20 to be installed towards the first position and continuously adjust the lifting height to maintain the real-time height at the first position matching the first splicing height, including:

Adjust the lifting point position of the segment 20 to be installed towards the first position and continuously adjust the lifting height at a second speed to maintain the real-time height at the first position matching the first splicing height.

Adjust the lifting point position of the segment 20 to be installed towards the second position and continuously adjust the lifting height to maintain the real-time height at the second position matching the second splicing height, including:

Adjust the lifting point position of the segment 20 to be installed towards the second position and continuously adjust the lifting height at the second speed to maintain the real-time height at the second position matching the second splicing height.

Where the first speed is greater than the second speed.

Since the height difference between the segment 20 to be installed and the installed segment 30 is relatively large during the initial lifting stage, the first speed can be used to lift the segment 20 to be installed quickly closer to the installed segment 30. Once the segment 20 to be installed reaches the height of the installed segment 30, smaller adjustments are needed, which can be achieved by adjusting at the second speed, making it easier to align the segment 20 to be installed with the installed segment 30.

In another embodiment, the first speed is variable and decreases as the real-time height at the first position approaches the first splicing height.

In one embodiment, the intelligent segment hoisting method further includes:

Obtain the displacement distance between the segment 20 to be installed and the installed segment 30.

Control the segment 20 to be installed to move towards the installed segment 30 by the displacement distance.

Once the height and angle of the segment 20 to be installed are fully adjusted, the displacement distance between the segment 20 to be installed and the installed segment 30 is obtained. Control the segment 20 to be installed to move towards the installed segment 30 by the displacement distance, effectively connecting the segment 20 to be installed with the installed segment 30.

Referring to FIG. 1, specifically, the displacement distance between the segment 20 to be installed and the installed segment 30 is obtained by:

Control the alignment distance sensor 310 to emit a distance sensing signal towards the segment 20 to be installed.

Obtain the shortest distance value corresponding to the shortest distance position sensed by the alignment distance sensor 310.

Determine the displacement distance between the segment to be installed and the installed segment based on the shortest distance value and the alignment height.

In another embodiment, the displacement distance can also be obtained by detecting the deflection angle of the distance sensing signal emitted by the alignment distance sensor 310 at the shortest distance position and determining the displacement distance based on the deflection angle and the alignment height.

In this embodiment, the alignment distance sensor 310 adjusts the sensing direction through the angle adjuster, thereby adjusting the measurement direction of the alignment distance sensor 310. When the segment 20 to be installed is set apart from the installed segment 30, the initial measurement direction of the alignment distance sensor 310 is aligned with the outer edge of the installed segment 30. When the angle adjuster drives the measurement direction of the alignment distance sensor 310 to rotate towards the segment 20 to be installed, the detected distance by the alignment distance sensor 310 instantly increases. As the measurement direction of the alignment distance sensor 310 gradually aligns with the bottom of the segment 20 to be installed, the detected distance begins to decrease. When the alignment distance sensor 310 aligns with the upper surface of the segment 20 to be installed facing the outer edge of the installed segment 30, the detected distance is the shortest. The distance value of the distance sensing signal emitted by the alignment distance sensor 310 at this position is the shortest distance value, or the deflection angle at this time can be obtained, which is the angle $\alpha$ in FIG. 1. Since the alignment height obtained by the alignment distance sensor 310 at the edge of the installed segment 30 is known, the displacement distance between the segment 20 to be installed and the installed segment 30 can be determined based on the trigonometric relationship. Finally, the segment 20 to be installed is controlled to move towards the installed segment 30 by this displacement distance to achieve the connection between the segment 20 to be installed and the installed segment 30.

In other embodiments, the angle adjuster can be omitted, and the emission angle of the distance sensing signal emitted by the alignment distance sensor 310 itself can be adjusted.

In one embodiment, the hoisting controller of the bridge deck crane system 10 is used to execute the steps of the intelligent segment hoisting method in any of the above embodiments.

It should be understood that although the steps in the flowchart of FIG. 4 are sequentially displayed according to the arrows, these steps are not necessarily executed in the order indicated by the arrows. Unless otherwise explicitly stated herein, there is no strict sequence restriction on the execution of these steps. They can be executed in other sequences. Moreover, at least some steps in FIG. 4 may include multiple steps or stages. These steps or stages are not necessarily completed at the same time. They can be executed at different times. The execution order of these steps or stages may not necessarily follow a sequence but can be alternated or interchanged with other steps or some parts of other steps.

In the description of this application, it should be understood that when terms such as "center," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," "circumferential," etc., are mentioned, these terms indicate positional or spatial relationships based on the positions or spatial relationships shown in the drawings and are only for the convenience of describing this application and simplifying the description. They do not indicate or imply that the referred-to devices or elements must have specific orientations, be constructed in specific orientations, or operate in specific orientations. Therefore, they should not be interpreted as limitations on this application.

Moreover, when terms such as "first" and "second" are mentioned, these terms are used only for descriptive purposes and should not be interpreted as indicating relative importance or implicitly specifying the number of technical features. Thus, features described as "first" or "second" can explicitly or implicitly include at least one such feature. In the description of this application, when the term "multiple" is mentioned, it means at least two, such as two or three, unless otherwise explicitly specified.

In this application, unless otherwise explicitly specified and limited, the terms "installed," "connected," "coupled," "fixed," and the like should be broadly interpreted. For example, they can be fixed connections, detachable connections, or integrated; they can be mechanical connections or electrical connections; they can be directly connected or connected through intermediate media; they can be internal communication between two elements or interaction between two elements, unless explicitly specified otherwise. Those skilled in the art can understand the specific meanings of these terms in this application according to specific circumstances.

In this application, unless otherwise explicitly specified and limited, when the first feature is mentioned to be "on" or "under" the second feature, it can be that the first and second features are directly in contact, or the first and second features can be in indirect contact through intermediate media. Moreover, when the first feature is described to be "above," "higher than," or "on" the second feature, it can be directly above, diagonally above, or simply indicates that the first feature's horizontal height is higher than the second feature. When the first feature is described to be "below," "lower than," or "under" the second feature, it can be directly below, diagonally below, or simply indicates that the first feature's horizontal height is lower than the second feature.

It should be noted that if an element is described as being "fixed to" or "disposed on" another element, it can be directly on the other element or exist as an intermediary element. If an element is considered "connected" to another element, it can be directly connected to another element or may also exist as an intermediary element. As for the use of the terms "vertical," "horizontal," "upper," "lower," "left," "right," and similar expressions, these are for illustrative purposes only and do not indicate that they are the only embodiments.

The technical features of the embodiments described above can be combined in any way. To make the description concise, not all possible combinations of the technical features in the embodiments have been described. However, as long as the combinations of these technical features are not contradictory, they should be considered within the scope of this specification.

The above-mentioned embodiments merely express some specific implementations of this application. The description is relatively specific and detailed, but it should not be construed as limiting the scope of the patent. It should be pointed out that for those skilled in the art, several modifications and improvements can be made without departing from the spirit of this application, and these are within the scope of this patent application. Therefore, the scope of this patent application should be subject to the claims.

What is claimed is:

1. An intelligent hoisting method for a bridge deck crane system, comprising:

obtaining an alignment height at an edge of an already installed segment, and deriving a first splicing height at a first position and a second splicing height at a second position of a segment to be installed based on said alignment height, wherein the distances between the first and second positions and the edge of the installed segment differ;

hoisting the segment to be installed and continuously monitoring a first real-time height at the first position and a second real-time height at the second position until the first real-time height equals the first splicing height or the second real-time height equals the second splicing height;

if the first real-time height equals the first splicing height, adjusting a hoisting point of the segment to be installed to move towards the first position while continuously adjusting a hoisting height to maintain the first real-time height equal to the first splicing height until the second real-time height equals the second splicing height;

if the second real-time height equals the second splicing height, adjusting the hoisting point of the segment to be installed to move towards the second position while continuously adjusting the hoisting height to maintain the second real-time height equal to the second splicing height until the first real-time height equals the first splicing height.

2. The intelligent hoisting method according to claim 1, further comprising:

simultaneously obtaining a third real-time height at a third position of the segment to be installed, wherein the third position corresponds to a location on the already installed segment different from the first position, and the distances from the third position and the first position to the edge of the installed segment are equal;

adjusting the hoisting height of the hoisting point at the third position and continuously adjusting the hoisting height to maintain the first real-time height equal to the first splicing height until the third real-time height equals the first splicing height.

3. The intelligent hoisting method according to claim 2, wherein obtaining the alignment height at the edge of the already installed segment comprises:

obtaining a first alignment height corresponding to the first position on the edge of the installed segment, and deriving the first splicing height at the first position of the segment to be installed based on said first alignment height;

obtaining a second alignment height corresponding to the third position on the edge of the installed segment, and deriving a third splicing height at the third position of the segment to be installed based on said second alignment height;

adjusting the hoisting height of the hoisting point at the third position until the third real-time height equals the third splicing height.

4. The intelligent hoisting method according to claim 1, wherein hoisting the segment to be installed and continuously monitoring the first and second real-time heights at the first and second positions comprises:

hoisting the segment at a first speed while continuously monitoring the first real-time height at the first position and the second real-time height at the second position;

adjusting the hoisting point of the segment to move towards the first position while continuously adjusting the hoisting height at a second speed to maintain the first real-time height equal to the first splicing height;

adjusting the hoisting point of the segment to move towards the second position while continuously adjusting the hoisting height at the second speed to maintain the second real-time height equal to the second splicing height, wherein the first speed is greater than the second speed.

5. The intelligent hoisting method according to any of claims 1 to 4, further comprising:

obtaining a displacement distance between the segment to be installed and the already installed segment;

controlling the segment to be installed to move towards the already installed segment by the obtained displacement distance.

6. The intelligent hoisting method according to claim 5, wherein obtaining a displacement distance between the segment to be installed and the already installed segment comprises:

controlling an alignment distance sensor to rotate towards the segment to be installed and emit a distance sensing signal;

obtaining a minimum distance value corresponding to the position of the shortest distance sensed by the alignment distance sensor;

deriving the displacement distance between the segment to be installed and the already installed segment based on the minimum distance value and the alignment height.

7. A bridge deck crane system, comprising:

a bridge deck crane body, which comprises a top operation platform, inclined support rods, and a rear pull assembly, wherein the top operation platform is arranged on the rear pull assembly, one end of each inclined support rod is connected to the top operation platform, the other end is connected to the rear pull assembly, and the inclined support rods are positioned below the top operation platform and inclined relative to the top operation platform;

a beam hoisting mechanism, which comprises a beam hanger, hoisting point shifting elements, a winch, hoisting ropes, and hoist positioning elements, wherein the winch is arranged on the top operation platform, the hoist positioning elements are arranged on the top operation platform and controlled to drive the winch to move, the hoisting point shifting elements are arranged on the beam hanger, one end of each hoisting rope is connected to the winch, and the other end is connected to the beam hanger through the hoisting point shifting elements to position the beam hanger below the inclined support rods, and the hoisting point shifting elements are controlled to move the connection position of the hoisting ropes and the beam hanger towards or away from the inclined support rods, and the winch is controlled to wind and unwind the hoisting ropes; and a hoisting control mechanism, which comprises an alignment distance sensor, a first distance sensor, a second distance sensor, and a hoisting controller, wherein the alignment distance sensor is arranged below the inclined support rods and aligned with the edge of the already installed segment, the first and second distance sensors are arranged below the inclined support rods and aligned with a segment to be installed, and the distances between the first and second distance sensors and a edge of the installed segment differ, the alignment distance sensor, first distance sensor, and second distance sensor are electrically connected to the hoisting controller, the alignment distance sensor is used to obtain a alignment height at the edge of the installed segment, the first distance sensor is used to obtain a first real-time height at the first position of the segment to be installed, the second distance sensor is used to obtain a second real-time height at the second position of the segment to be installed, and the hoisting controller is configured to execute the steps of the method according to claim 1.

8. The bridge deck crane system according to claim 7, wherein the hoisting control mechanism further comprises an angle adjuster, the alignment distance sensor is arranged on the inclined support rods through the angle adjuster, the angle adjuster is used to drive the alignment distance sensor to rotate towards or away from the first distance sensor, and the hoisting controller is configured to obtain the rotation angle driven by the angle adjuster and continuously obtain the sensing distance of the alignment distance sensor.

9. The bridge deck crane system according to claim 7 or 8, wherein the number of inclined support rods is two, the two inclined support rods are arranged opposite each other, the number of beam hoisting mechanisms is two, the two beam hoisting mechanisms are arranged opposite each other, each beam hoisting mechanism is arranged on one of the inclined support rods, the alignment distance sensor is arranged on one of the inclined support rods, the hoisting control mechanism further comprises a third distance sensor, the first distance sensor and the third distance sensor are arranged on different inclined support rods, the second distance sensor is arranged on one of the inclined support rods, and the first and second distance sensors are positioned at different height positions on the inclined support rods, the third distance sensor is used to obtain a third real-time height at a third position of the segment to be installed.

10. The bridge deck crane system according to claim 9, wherein the number of alignment distance sensors is two, and the two alignment distance sensors are respectively arranged at the same height positions on the two inclined support rods, one of the alignment distance sensors is used to obtain a first alignment height corresponding to the first position of the edge of the installed segment, and the other alignment distance sensor is used to obtain a second alignment height corresponding to the third position of the edge of the installed segment.

* * * * *